United States Patent [19]

Swanson

[11] 4,307,560
[45] Dec. 29, 1981

[54] HEADER HEIGHT POSITION CONTROL FOR A COTTON HARVESTER

[75] Inventor: William C. Swanson, Clarendon Hills, Ill.

[73] Assignee: International Harvester Company, Chicago, Ill.

[21] Appl. No.: 210,982

[22] Filed: Nov. 28, 1980

[51] Int. Cl.³ .......................................... A01D 69/00
[52] U.S. Cl. ............................. 56/11.9; 56/DIG. 11; 56/DIG. 15; 56/208
[58] Field of Search .................. 56/10.2, 11.9, 208, 56/DIG. 10, DIG. 11, DIG. 15, 28–50

[56] References Cited

U.S. PATENT DOCUMENTS

| | | | |
|---|---|---|---|
| 2,949,924 | 8/1960 | Cochrane | 137/99 |
| 4,197,690 | 4/1980 | Eistert et al. | 56/10.2 |
| 4,197,694 | 4/1980 | Hagie et al. | 56/10.2 |
| 4,203,275 | 5/1980 | Vermeer | 56/208 |

FOREIGN PATENT DOCUMENTS

| | | | |
|---|---|---|---|
| 2555283 | 6/1977 | Fed. Rep. of Germany | 56/10.2 |
| 682167 | 8/1979 | Japan | 56/11.9 |

*Primary Examiner*—Robert A. Hafer
*Attorney, Agent, or Firm*—Douglas W. Rudy; F. David AuBuchon

[57] ABSTRACT

A cotton harvester (10) is provided with several independently hydraulically adjustable heater units (16) that are movable in unison or completely independently depending on ground plane elevation. A rotary flow divider (30) is positioned in the supply conduit (42) to the header units (16) to control synchronous movement of the units.

14 Claims, 2 Drawing Figures

HEADER HEIGHT POSITION CONTROL FOR A COTTON HARVESTER

CROSS-REFERENCES TO RELATED APPLICATIONS

This application is related to application Ser. No. 210,936 (D-3891) filed Nov. 28, 1980, titled "Improved Header Height Control for a Cotton Harvester" and application Ser. No. 210,983 (D-3889) filed Nov. 28, 1980, titled "Header Height Control for a Cotton Harvester".

BACKGROUND OF THE INVENTION

1. Field of the Invention

This invention is concerned with crop harvesting machines having front mounted header units for crop gathering. More specifically a hydraulic control system utilizing a rotary flow divider to balance the raise and lower action of the header units is provided. Individual header unit height is controlled through ground sensing devices for each header unit.

2. Description of the Prior Art

Contemporary crop harvesting vehicles for example cotton harvesters, that is both cotton strippers and cotton picking machines, are commonly equipped with front mounted gathering units or headers that will remove the cotton crop from the plants as the harvester moves through the field.

The automatic height sensing devices now in use utilize a ground sensing shoe that is connected through a linkage to a row unit lift valve. The row unit lift valve is an open or closed valve that will supply fluid under pressure to the cylinder attached to the row unit whereby extension of the cylinder rod will cause the row unit to be raised.

SUMMARY OF THE INVENTION

A cotton harvester has a plurality of front mounted crop gathering and harvesting headers. Each unit is a self contained header independently controlled to be raised and lowered responsive to the terrain over which the cotton harvester is traveling. The cotton harvester includes a source of hydraulic fluid which is used to raise the header units while the weight of the unit will cause a discharge of fluid from the associated cylinder when the fluid source is diverted.

The hydraulic fluid will be delivered to the header units through a manual control valve that will be operated when it is desired that all the header units be raised or lowered in unison. Between the manual control valve and the header units there is a rotary flow divider having one fluid distribution pump/motor for each header unit of the harvester.

A terrain responsive valve is associated with each header unit and will allow the metered opening of the return line port of the hydraulic cylinder associated with that particular header unit.

It is among the objects of this invention to provide a cotton harvester header control system that will allow the raising and lowering of the header units at the same rate in synchronized unison when the manual control of the units is effected by the operator to either raise or lower the header units.

It is also an object of the invention to provide a hydraulic system for a cotton harvester having drop restrictor limits to control the rate of drop of the header units.

It is a further object of the invention to provide for continuous independent running adjustments in each header while having the ability to raise all the header units simultaneously. Each row unit has a height sensing shoe that reads the contour of the ground and automatically keeps the unit working at the predetermined stripping height. This frees the operator of constantly "riding" the height control levers to maintain the proper stripping height and it assures the operator of getting more cotton with less dirt and trash.

Another feature of the row units is that they automatically return to the preset stripping height after one unit has been raised. The operator can override the ground sensing system at any time to raise all the units to cross a waterway or to turn around at the end of the rows.

BRIEF DESCRIPTION OF THE DRAWING FIGURES

The above objects and advantages of this invention will be apparent from a careful perusal of this specification in conjunction with the drawing figures wherein.

DETAILED DESCRIPTION OF THE INVENTION

Figure 1:
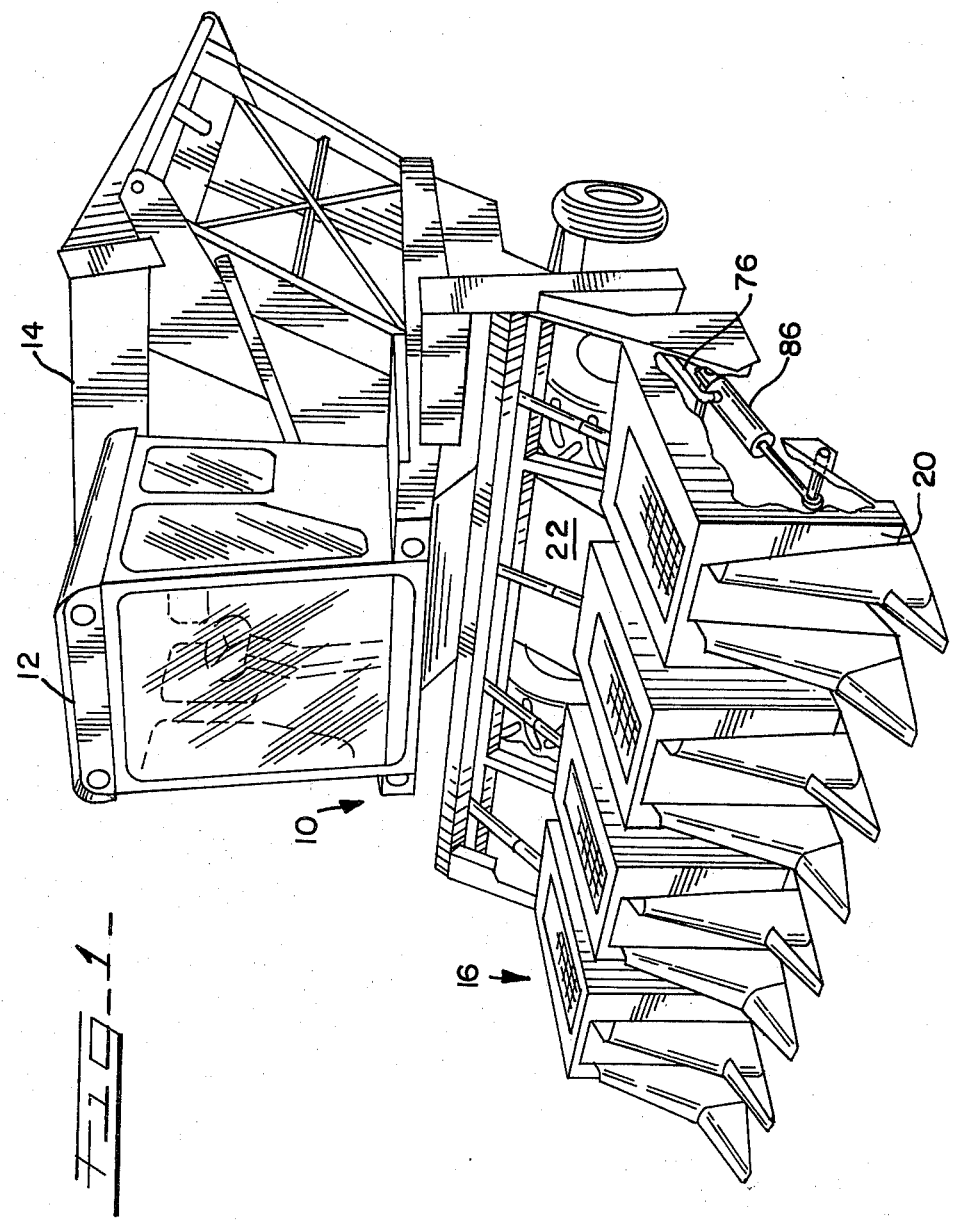
FIG. 1 is a pictorial representation of a cotton harvester.

FIG. 1 shows a cotton harvester generally 10 having an operator's compartment 12 and a crop basket 14 into which the harvested product is delivered.

A crop gathering device generally 16 is carried on the front portion of the cotton harvester and is comprised of a plurality of header units such as 20. In the embodiment illustrated four header units are shown, each unit delivering its harvested product through a delivery chute 22 for eventual accumulation in the basket 14.

Each header unit 20, more commonly a stripper unit on the stripper type cotton harvester shown, is a brush roll-type unit. There may be a plurality of row units per machine with a cross auger connecting the plurality of row units. The stripping units consist of two stripper rolls arranged generally parallel to each other, of alternating rubber flaps and nylon brushes, two augers, drive gear boxes and shafts.

In the stripper operation the machine is driven through a cotton field whereby cotton plants enter the front of the row unit and are positioned and gathered by gatherers. The brush rolls strip the cotton plant of the green bolls and open cotton. The harvested material is then conveyed to the cross auger by the row unit augers where it is moved from each row unit to the center chute 22 by the cross auger and delivered to an air stream.

The cotton is separated by the air stream where the cotton is blown into the basket 14 and the green bolls fall into a boll box.

Figure 2:
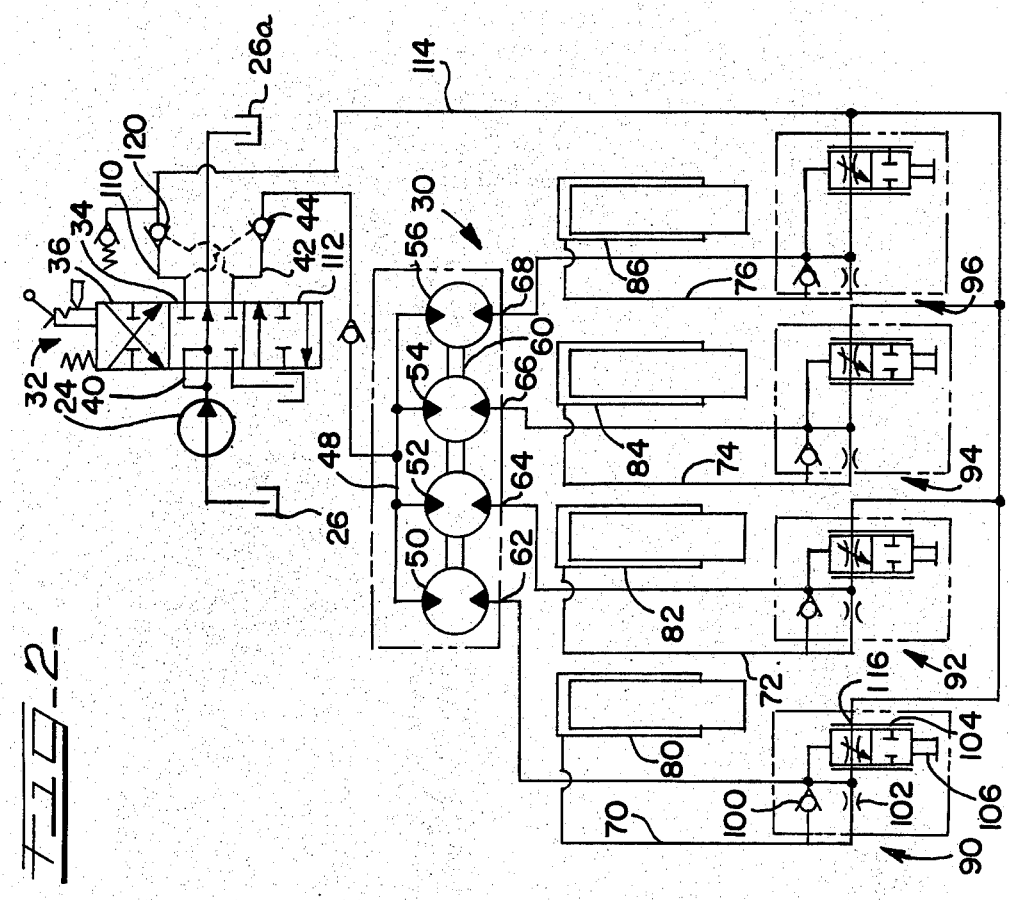
FIG. 2 is a hydraulic schematic of a header raise and lower system as used in this invention.

The invention is concerned with the hydraulic system used to raise and lower, as well as undulate the header units, as shown in FIG. 2.

As can be seen, a source of fluid pressure is provided by pump 24 that draws hydraulic fluid from a reservoir 26. The pump 24 is capable of providing total flow requirements of the header units. A manually controlled three position four-way valve is interposed between the pump 24 and the rotary flow divider generally 30.
}

The manual control valve generally 32 could be any type of three position valve but the embodiment shown includes a neutral section 34 that passes pump output directly to reservoir 26a. In a first position represented by section 36 of the manual valve, the pump 24 will draw hydraulic fluid from the reservoir 26 and deliver it through first delivery conduit 40 to first supply conduit 42. First pilot operated check valve 44 will allow fluid to pass to line check valve 46 which will allow flow to, but not from, the rotary flow divider generally 30. The rotary flow divider is mounted downstream from the manual control valve either on the crop harvesting vehicle or on the crop gathering device.

The fluid flow from the pump is delivered to a conduit manifold 48 and equally divided by the gear sets in the rotary flow divider generally 30 and is subsequently distributed on to each unit lift cylinder.

The rotary flow divider 30 used in the preferred embodiment illustrated is a gear type unit having the conduit manifold 48, four gear pumps 50, 52, 54 and 56 interconnected by means of a shaft 60 and four outlet ports 62, 64, 66 and 68. The rotary flow divider generally 30 is a hydraulic fluid control device having multiple segments. As stated, each segment is made up of a gear type or vane type fluid transfer device that can act either as a pump or a motor depending on the flow through the rotary flow divider and the pressure at the output ports of the rotary flow divider. The pump elements are interconnected to each other on the common shaft 60 to rotate synchronously. The volume of fluid flowing through the rotary flow divider will always be equalized, although the pressure at one or more of the orifices may be intensified.

A typical rotary flow divider is shown in U.S. Pat. No. 2,949,924 issued to A. M. Cochran, Jr. A pair of vane type fluid transfer devices are used in the Cochran invention although gear type—as used in gear type hydraulic pumps—are also used in rotary flow dividers. Each fluid transfer device is capable of functioning as a bi-directional pump when the shaft 60 is rotated and capable of functioning as a bi-directional motor when flow of hydraulic fluid is directed therethrough.

The outlet ports 50, 52, 54 and 56 are connected through lift cylinder supply lines 70, 72, 74 and 76 to independent single acting lift cylinders 80, 82, 84 and 86. Each lift cylinder is pivotally mounted between said crop gathering device and one of each of the independently pivoted header units. All the lift cylinders are similar with each having ground variation feeler systems generally 90, 92, 94 and 96. These as shown are the variable orifice valves driven by the ground feelers not shown.

Each ground variation feeler such as item generally 90 includes a lift cylinder check valve 100 interposed in the lift cylinder supply and return line such as 70 that can pass fluid from the rotary flow divider generally 30 to the lift cylinder such as 80.

A metering orifice 102 is connected in parallel with the lift cylinder check valve 100 whereby fluid flowing in one direction through the metering orifice 102 will create a pressure drop during the lower mode.

Connected in series with each lift cylinder such as 80, and part of the ground variation feeler system generally 90, is a variable orifice valve assembly 104 comprised of a ground variation sensor 106 (symbolically represented, but more typically including a ground contact plate hinged to the gathering header) directly linked to, for instance, the spool of a variable orifice valve. The variable orifice valve assembly could, of course, be one of several types of variable orifice valves with a preferred embodiment shown.

Looking only at the operation of one independent lift cylinder 80 and its ground variation feeler system generally 90, it can be seen that as fluid is supplied from output port 62 of the rotary flow divider 30 the hydraulic system will attempt to balance the weight of the associated crop gathering unit hinged to the front of the cotton harvester. As the machine moves forward through the cotton field, the ground variation sensor 106 will ride up and down over the undulations of the ground. The variable orifice valve 104 will be adjusted to increase or decrease its flow capacity to generate sufficient back pressure from the fixed flow as generated from the rotary flow divider. When a rise in terrain is sensed, or a temporary obstruction encountered, the ground variation sensor 106 reduces the size of the variable orifice causing increased pressure to the lift cylinder 80 to overcome the unit balance pressure. Part of the hydraulic flow is directed to the lift cylinder to raise the gathering unit to a height for a new balance pressure.

As the ground plane falls away, for instance if a depression is encountered, the converse operation takes place. The ground variation sensor 106 will swing down opening the variable orifice valve 104, the variable pressure decays and the weight of the gathering unit pivoting around its hinged attachment to the header assembly forces some hydraulic fluid out through the orifice 102 and the variable orifice valve 104 thus causing the gathering unit to repose at a new balance position.

It should be noted that although the explanation involved only a single lift cylinder 80 and ground variation feeler system assembly generally 90, the other three units operate in identical fashion.

The advantage of using the rotary flow divider is that all (of the four) crop gathering units will receive fluid at an equal rate when necessary and no single unit will dominate or take preference over the others. As the variable orifice valve assemblies 104 are always open to some degree when the cotton harvester is being driven through a field with the gathering units lowered the rotary flow divider will always be turning. If one of the lift cylinders 80, 82, 84 or 86 has balanced its load then hydraulic fluid will pass thru variable orifice valves 104 generating sufficient back pressure to support its load. When all the gathering units are balanced, the excess flow will be distributed and exhausted through the partially open variable orifice valves 104. If all the gathering units, specifically their associated ground variation sensors 106 for instance encounter a hole or an obstruction they will all fall or rise at the same rate.

When the cotton harvester reaches the end of a work row or when the crop gathering units are to be lifted to enable the machine to be loaded on a trailer, roaded or otherwise transported it is desirous to raise the units. For this operation the three position four-way valve is moved to energize the opposite work port 110 by shifting the manual control valve generally 32 to a position where the segment 112 is operational. Hydraulic fluid flow will be routed through second supply conduit 114 to the normal outlet port 116 of the variable orifice valve assembly 104. The fluid flow will continue back through the rotary flow divider generally 30 and against the now closed line check valve 46.

The pump 24 will continue to deliver fluid under pressure and as the pressure rises in each lift cylinder, 80, 82, 84 and 86, higher than the balance pressure, the header units such as 20 will rise to the top of the lift cylinder stroke. As each lift cylinder comes to the end of its stroke the unneeded fluid will be diverted from that cylinder thru conduit 114 and on to a lift cylinder that is still rising and requiring fluid.

When the lift cylinders have raised all the header units the operator releases the control lever of the manual control valve generally 32 which centers itself. All the units will now be locked in the raised position as the first pilot operated check valve 44 (as well as the line check valve 46) and the second pilot operated check valve 120 will both be seated without any pilot signal to unseat them.

Although this application sets forth a specific embodiment comprising a cotton harvester the inventor contemplates that the hydraulic control aspect of the invention would serve equally well on other types of farm equipment crop harvesting vehicles such as combines or forage harvesters.

A further refinement is to engineer the number of rotary flow divider elements to maximize reaction response characteristics and minimize cost. It is contemplated that two or more lifting cylinders could be serviced by a single rotary flow divider element or conversely a single lift cylinder could be supplied by more than one rotary flow divider element. In other cases it may be desirable to have a rotary flow divider with a number of elements that would exceed the number of lift cylinders being used in a particular arrangement. In that case it would be expected that the extra elements could by-pass the metered flow and only the operative units used.

Thus it can be seen that there has been provided a header height control system wherein a plurality of independent lift cylinders are supplied with hydraulic fluid under pressure through a rotary flow divider that fully satisfies the objects of this invention.

What is claimed is:

1. In a crop harvesting machine having a crop gathering device including header units independently pivoted to said crop gathering device, the improvement comprising:
    a source of hydraulic fluid available to said crop harvesting vehicle;
    a manual control valve hydraulically communicating with said source of hydraulic fluid;
    a rotary flow divider having a plurality of rotary flow divider output ports, said rotary flow divider providing equalized fluid delivery to said output ports, said rotary flow divider hydraulically communicating with said manual control valve;
    a plurality of independent single acting lift cylinders, one of each of said cylinders pivotally mounted between said crop gathering device and one of each of said independently pivoted header units for allowing the raising of said header units;
    a line check valve allowing flow from said manual control valve to said rotary flow divider;
    a second supply conduit leading from said manual control valve to each of said single acting lift cylinders;
    a plurality of variable orifice valve assemblies, one of said valve assemblies interposed between each of said single acting lift cylinders and said second supply conduit;
    a plurality of ground variation sensors carried on said header units for sensing ground plane undulations, one of said sensors associated with one each of said variable orifice valve assemblies for adjusting said variable orifices in response to ground plane undulations whereby said lift cylinder will be supplied with fluid when said ground variation sensor causes adjustment of said variable orifice to become less restrictive.

2. The invention in accordance with claim 1 wherein said manual control valve is a three position valve having a detent maintained first position allowing flow from said source of hydraulic fluid to pass unimpeded through said line check valve to said rotary flow divider.

3. The invention in accordance with claim 2, wherein said second supply conduit includes a second pilot-operated check valve being pilot operated to open when said manual control valve is in said first position whereby flow in said second supply conduit is uninterrupted.

4. The invention in accordance with claim 1, wherein said manual control valve is a three position valve having a third position allowing flow from said source of hydraulic fluid to pass to said lift cylinders and said rotary flow divider while causing said line check valve to be closed.

5. The invention in accordance with claim 1, wherein each of said variable orifice valve assemblies will be adjusted responsive to said ground variation sensor to provide maximum restriction when said ground variation sensor indicates a rising ground plain whereby pressure will build on said rotary flow divider side of said variable orifice valve assembly pressurizing said lift cylinder and diverting said flow raising said header units and wherein each of said variable orifice valve assemblies will be adjusted responsive to said ground variation sensor to provide minimum restriction when said ground variation sensor indicates a decreasing ground plane whereby flow will be bled off on said rotary flow divider side of said variable orifice valve assembly causing said lift cylinder to lower the elevation of said header unit.

6. The invention in accordance with claim 1 wherein said variable orifice valve assemblies each comprise:
    a lift cylinder check valve; and
    a metering orifice connected in parallel with said lift cylinder check valve both said lift cylinder check valve and said metering orifice located between said rotary flow divider output ports and said single acting lift cylinder upstream of said variable orifice valve assembly, said lift cylinder check valve allowing unrestricted fluid flow from said rotary flow divider to said independent single acting lift cylinder and said metering orifice creating a pressure drop when said hydraulic fluid flows from said single acting lift cylinder to said variable orifice valve assembly.

7. The invention in accordance with claim 1 wherein said rotary flow divider pump elements are gear pumps.

8. The invention in accordance with claim 1 wherein said rotary flow divider pump elements are vane type pumps.

9. The invention in accordance with claim 1 wherein said rotary flow divider has a number of pump elements corresponding to the number of lift cylinders of said crop gathering device.

10. The invention in accordance with claim 1, wherein said rotary flow divider has a number of pump elements greater than the number of lift cylinders of said crop gathering device.

11. The invention in accordance with claim 1 wherein said rotary flow divider has a number of pump elements being a multiple of the number of lift cylinders of said crop gathering device.

12. In a self propelled crop harvesting vehicle having a chassis supported on a plurality of ground support wheels, a source of hydraulic fluid and a manual control valve for distribution of said hydraulic fluid, a crop gathering device including header units independently pivoted to said crop gathering device and attached to said crop harvesting vehicle, the improvement comprising:

a rotary flow divider having a plurality of pump elements interconnected to each other and rotatable synchronously on a common shaft, said rotary flow divider mounted downstream of said manual control valve and providing equalized fluid delivery from each of said plurality of pump elements;

a plurality of ground variation sensors, one of said sensors associated with one each of said header units;

a plurality of independent single acting lift cylinders, one of each of said cylinders pivotally mounted between said crop gathering device and one of each of said independently pivoted header units for allowing the raising of said header units responsive to said ground variation sensor;

a first supply conduit connecting said manual control valve to said rotary flow divider;

a line check valve in said first supply conduit allowing fluid flow from said manual control valve to said rotary flow divider;

a plurality of rotary flow divider output ports, one port associated with each one of said plurality of pump elements;

a plurality of lift cylinder supply lines, one of each supply lines connecting one respective output port of said rotary flow divider to one of said plurality of independent single acting lift cylinders;

a lift cylinder check valve in each of said lift cylinder supply lines allowing unimpeded fluid flow from said rotary flow divider to each respective single acting lift cylinders;

a second supply conduit leading from said manual control valve to each of said lift cylinder supply lines;

a plurality of variable orifice valve assemblies, one of said valve assemblies interposed between each of said lift cylinder supply lines and said second supply conduit, said variable orifice valve assemblies movable responsive to the position of respective said ground variation sensors metering flow to respective lift cylinders whereby said lift cylinder will be supplied with fluid when said ground variation sensor causes said variable orifice to become more restrictive.

13. The invention in accordance with claim 7 wherein each variable orifice valve assembly is open to a maximum degree when said ground variation feeler is out of contact with the ground.

14. The invention in accordance with claim 1, wherein said first supply conduit is interrupted by a first pilot operated check valve located between said manual control valve and said line check valve capable of passing fluid unimpeded from said manual control valve to said rotary flow divider and also passing fluid from said first supply conduit, said first supply conduit having a pilot line connected to said second pilot operated check valve, said pilot line allowing fluid pressure to unseat said pilot operated check valve when hydraulic fluid pressure in said first supply line is greater or lower than the hydraulic fluid pressure in said second supply conduit, thru now open said second pilot operated check valve to pass thru said manual control valve to said reservoir.

* * * * *